(12) United States Patent
Wolpert et al.

(10) Patent No.: US 12,271,674 B2
(45) Date of Patent: Apr. 8, 2025

(54) GENERATING A POWER DELIVERY NETWORK BASED ON THE ROUTING OF SIGNAL WIRES WITHIN A CIRCUIT DESIGN

(71) Applicant: International Business Machines Corporation, Armonk, NY (US)

(72) Inventors: David Wolpert, Poughkeepsie, NY (US); Matthew T. Guzowski, Essex Junction, VT (US); Michael Hemsley Wood, Wilmington, DE (US); Leon Sigal, Monsey, NY (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 17/656,041

(22) Filed: Mar. 23, 2022

(65) Prior Publication Data
US 2023/0306176 A1  Sep. 28, 2023

(51) Int. Cl.
*G06F 30/394* (2020.01)
*G06F 119/12* (2020.01)

(52) U.S. Cl.
CPC ........ *G06F 30/394* (2020.01); *G06F 2119/12* (2020.01)

(58) Field of Classification Search
CPC ............................ G06F 30/394; G06F 2119/12
See application file for complete search history.

(56) References Cited

U.S. PATENT DOCUMENTS

| | | | |
|---|---|---|---|
| 6,260,184 B1 * | 7/2001 | Brennan | G06F 30/394 716/133 |
| 6,609,242 B1 | 8/2003 | Slade | |
| 6,675,139 B1 * | 1/2004 | Jetton | G06F 30/367 716/120 |
| 7,016,794 B2 * | 3/2006 | Schultz | G06F 30/367 702/65 |
| 8,914,764 B2 | 12/2014 | Bose et al. | |
| 8,914,765 B2 | 12/2014 | Sigal et al. | |

(Continued)

FOREIGN PATENT DOCUMENTS

JP  H10173054 A  6/1998

OTHER PUBLICATIONS

Authors et al., "Substrate Contact Enablement for Hierarchical Awareness in Foreign and Native Power Regions," ip.com, IP.com No. IPCOM000269201D, Dated Mar. 29, 2022, pp. 1-4.

(Continued)

*Primary Examiner* — Nha T Nguyen
(74) *Attorney, Agent, or Firm* — Patterson + Sheridan, LLP

(57) ABSTRACT

Method and apparatus for generating an updated power delivery network. Generating the power delivery network includes determining power characteristics for a power delivery network of a circuit design based on logic cells of the circuit design. The power delivery network includes power wires and power staples connecting pairs of the power wires to each other. Further a first one or more of the power staples is remove from the power delivery network based on the power characteristics. Signal wires for the logic cells are routed after removing the first one or more of the power staples. Routing the signal wires includes routing a first signal wire of the signal wires in a routing track corresponding to the first one or more of the power staples.

17 Claims, 5 Drawing Sheets

(56) References Cited

U.S. PATENT DOCUMENTS

| | | | | |
|---|---|---|---|---|
| 9,183,345 | B2* | 11/2015 | Lin | G06F 30/394 |
| 9,245,077 | B2 | 1/2016 | Chuang et al. | |
| 9,639,650 | B2 | 5/2017 | Yuan et al. | |
| 10,366,954 | B1 | 7/2019 | Kim et al. | |
| 10,510,774 | B2 | 12/2019 | Debacker et al. | |
| 10,748,889 | B2 | 8/2020 | Berzins et al. | |
| 11,972,188 | B2* | 4/2024 | Das | G06F 30/392 |
| 2002/0170020 | A1* | 11/2002 | Darden | G06F 30/394 |
| | | | | 716/120 |
| 2007/0094630 | A1 | 4/2007 | Bhooshan | |
| 2007/0143727 | A1* | 6/2007 | Kyoya | G06F 30/39 |
| | | | | 716/133 |
| 2014/0159500 | A1 | 6/2014 | Sankar et al. | |
| 2017/0116367 | A1* | 4/2017 | Bickford | G06F 30/396 |
| 2017/0147727 | A1* | 5/2017 | Bickford | G06F 30/394 |
| 2021/0343699 | A1* | 11/2021 | Kim | H01L 29/78618 |
| 2022/0164513 | A1* | 5/2022 | Chao | G06F 30/392 |
| 2022/0293522 | A1* | 9/2022 | Thyagarajan | G06F 30/394 |
| 2024/0039518 | A1* | 2/2024 | Ou | H03K 3/012 |
| 2024/0349378 | A1* | 10/2024 | Wang | H04W 76/16 |

OTHER PUBLICATIONS

U.S. Appl. No. 17/386,976, filed Jul. 28, 2021.
U.S. Appl. No. 17/567,978, filed Jan. 4, 2022.
U.S. Appl. No. 17/584,605, filed Jan. 26, 2020.
IPCOM000267712D—Authors et al., "Fill and Extraction-Aware Rivets Methodology," ip.com, dated Nov. 16, 2021, pp. 1-3.
IPCOM000267559D—Authors et al., "Method of Early Identification of Under-Bump Metal Density Failures in Designs Without C4 Placed Directly," ip.com, dated Nov. 2, 2021, pp. 1-3.
IPCOM000267557D—Authors et al, "Leveraging Internal Voltage Nodes to Implement a Series MIMCAP for PLLS," ip.com, dated Nov. 2, 2021 pp. 1-4.
PCT, Notification of Transmittal of The International Search Report and Written Opinion of The International Searching Authority, of The Declaration for Application PCT/CN2023/073800 dated Apr. 18, 2023.
Authors et al., "An Apparatus and Method for Higher Efficiency Mitigation of Antenna Fails in Integrated Circuits and Multi-Voltage Integrated Circuits," IP.com, IP.com No. IPCOM000270655D, Dated Jul. 26, 2022, pp. 1-4.

* cited by examiner

US 12,271,674 B2

GENERATING A POWER DELIVERY NETWORK BASED ON THE ROUTING OF SIGNAL WIRES WITHIN A CIRCUIT DESIGN

BACKGROUND

The present invention relates to routing wires within a semiconductor device, and more specifically, to adjusting the power delivery network of a semiconductor device for routing signal wires.

In Very Large Scale Integration (VLSI) circuits, there is limited space for routing the power delivery network and signal wires. The power delivery network, or power grid, includes power wires and power staples. The power wires include power first and second power wire rails (e.g., VDD power wires and VSS ground wires). The power staples connect power wire rails associated with the same power wire with each other to reduce voltage drop (IR drop) within the power grid. For example, one or more power staples connect two VDD power wires, and one or more power staples connect two VSS power wires.

The power staples may be placed as part of a pre-placement flow or a post-placement flow. In a pre-placement flow, the power staples are placed at fixed intervals before the signal wires are routed. However, when placing the power staples as part of the pre-placement flow, the power staples decrease the area available to route the signal wires. Accordingly, the difficulty to place the signal wires is increased, and the flexibility of the routing process is decreased. In a post-placement flow, the power staples are inserted after routing the signal wires. However, during the post-placement flow the area in which the power staples can be placed is limited by the signal wire locations, potentially increasing the voltage drop within the power delivery network. Alternatively, power staples may be placed during a placement flow based on the power requirements of the cells associated with the power grid. However, the power requirement assumptions are likely to use the worst-case scenario, representing the maximum power requirements of the cells. Accordingly, the number of power staples is likely greater than what is needed to provide the necessary current to the cells.

SUMMARY

According to one embodiment of the present invention, a method includes determining power characteristics for a power delivery network of a circuit design based on logic cells of the circuit design. The power delivery network includes power wires and power staples connecting pairs of the power wires to each other. The method further includes removing a first one or more of the power staples from the power delivery network based on the power characteristics. Further, the method includes routing signal wires for the logic cells after removing the first one or more of the power staples. Routing the signal wires includes routing a first signal wire of the signal wires in a routing track corresponding to the first one or more of the power staples.

According to one embodiment of the present invention, a circuit design system includes an analysis engine and a routing engine. The analysis engine determines power characteristics for a power delivery network of a circuit design based on logic cells of the circuit design. The power delivery network includes power wires and power staples connecting pairs of the power wires to each other. The analysis engine further removes a first one or more of the power staples from the power delivery network based on the power characteristics. The routing engine routes signal wires for the logic cells after removing the one or more of the power staples. Routing the signal wires includes routing a first signal wire of the signal wires in a routing track associated with the first one or more of the power staples.

According to one embodiment of the present invention, a computer program product for generating a circuit design includes a computer-readable storage medium having computer-readable program code embodied therewith. The computer-readable program code is executable by one or more computer processors to determine power characteristics for a power delivery network of the circuit design based on logic cells of the circuit design. The power delivery network comprises power wires and power staples connecting pairs of the power wires to each other. The power-readable program is further executed by the one or more computer processors to remove a first one or more of the power staples from the power delivery network based on the power characteristics, and route signal wires for the logic cells after removing the first one or more of the power staples. Routing the signal wires includes routing a first signal wire of the signal wires in a routing track associated with the first one or more of the power staples.

DETAILED DESCRIPTION

In Very Large Scale Integration (VLSI) circuits, there is limited space for routing the power delivery network and signal wires. The power delivery network includes power wires (or lines) associated with a first power supply (e.g., VDD power wires) and a second power supply (e.g., VSS power wires), and power staples connecting pairs of the power wires together to reduce voltage drop (IR drop) within the power delivery network. In many instances, to mitigate voltage drop, the number of power staples are placed without taking into account the signal wire routing. Accordingly, the space to route the signal wires is limited.

In the following, an improved process for placing power staples is described. The process includes generating the power delivery network which includes placing the power staples within a power tile of circuit design and determining the timing characteristics of the power tile. Further, the process includes removing the power staples based on the timing characteristics, and routing the signal wires for the cells within the power tile after removing the power staples. In one example, after the signal wires are routed, the power staples are inserted (e.g., repopulated and/or over-populated) within the power tile based on the available space, so as to generate an updated power tile. An updated timing model is generated for the updated power tile. Accordingly, as the signal wires (or signal lines) are routed after decreasing the number of power staples, the amount of area available to route signal wires is increased, decreasing the difficulty and increasing the efficiency of the routing process. Inserting power staples (to repopulate or overpopulate) after routing the signal wires decreases the voltage drop within the power delivery network, increasing the current provided by the power delivery network to each of the corresponding logic elements.

Figure 1:
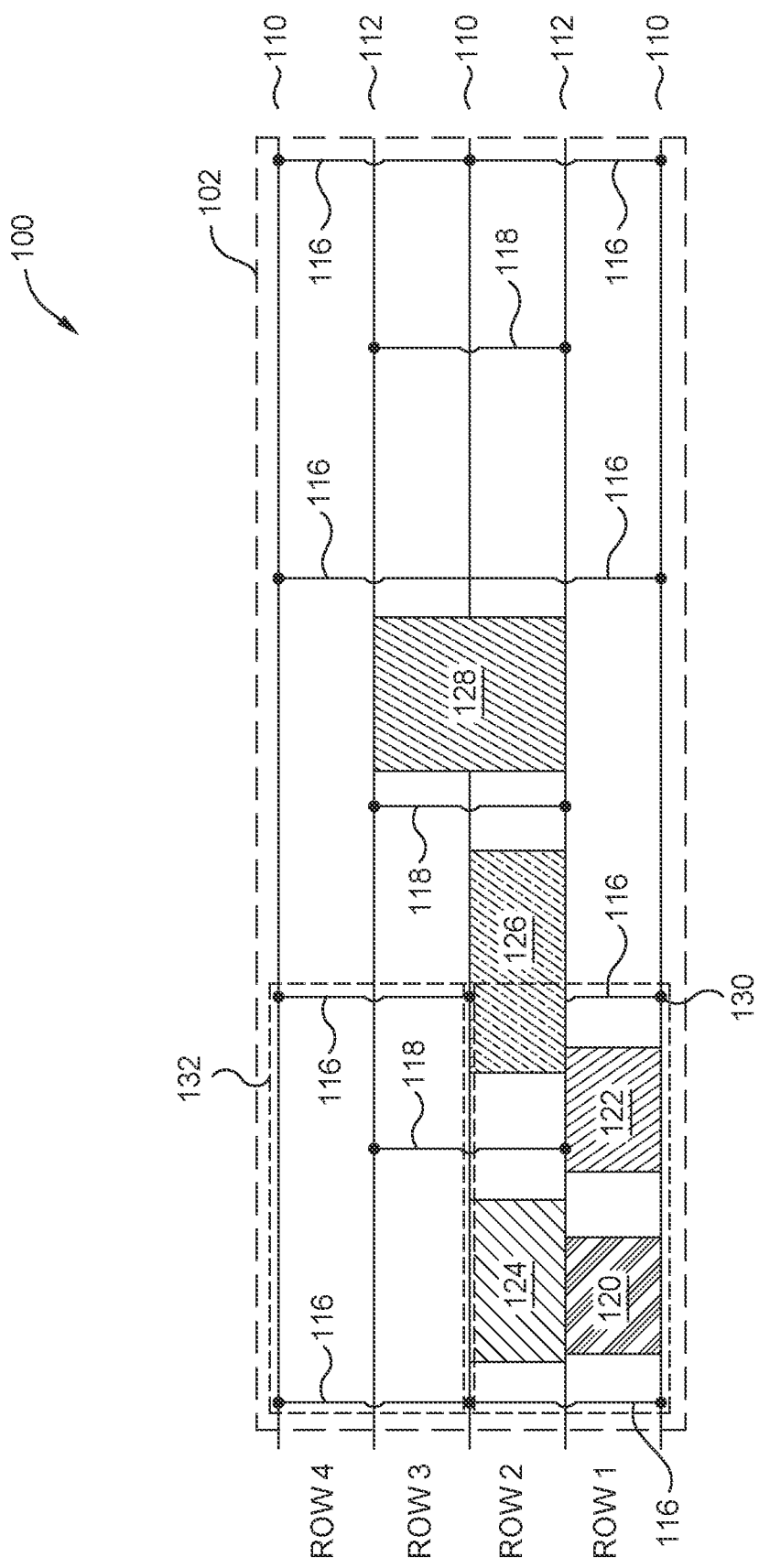
FIG. 1 illustrates a power delivery network of a circuit design, according to one or more examples.

FIG. 1 illustrates a schematic top view of a circuit design 100, according to one or more examples. The circuit design 100 includes a power delivery network 102. The power delivery network 102 includes power wires 110 and power wires 112. The power wires 110 provide a first power supply voltage (e.g., VDD), and the power wires 112 provide a second power supply voltage (e.g., VSS). In one embodiment, the first power supply voltage is greater than the second power supply voltage. In one example, the first power supply voltage is about 3.3 V or about 5 V, and the second power supply voltage is a ground voltage. In one example, the power delivery network 102 includes multiple power tiles that are bounded by power wires, e.g., the power wires 110 or the power wires 112 and the associated power staples, e.g., the power staples 116 and 118. For example, the power wires 110 and the power staples 116 form first power tiles and the power wires 112 and the power staples 118 form second power tiles.

The power delivery network 102 includes one or more metal layers (not shown) in which the power wires 110 and the power wires 112 are routed. The power wires 110 are connected to each other via power staples 116. The power staples 116 reduce the voltage drop within the power delivery network. The power wires 112 are connected to each other via power staples 118. The power staples 116 and 118 are wires, or jumpers, that connect the power wires 110 to each other in a metal layer different than that of the power wires 110 and the power wires 112.

In one example, the power delivery network 102 includes multiple power tiles that are bounded by power wires, e.g., the power wires 110 or the power wires 112 and the associated power staples, e.g., the power staples 116 and 118. For example, the power wires 110 and the power staples 116 form first power tiles and the power wires 112 and the power staples 118 form second power tiles.

The circuit design 100 includes cells (e.g., library cells) 120-128. The cells 120-128 may be part of a standard library of cells. The cells 120-128 are logic cells or functional cells. For example, the cells 120-128 may include inverter logic or other gate logic (e.g., AND logic, OR logic, NOR logic, XNOR logic, and XOR logic, among others). The cells 120-128 are connected to the power wires 110 and 112 to receive the first and second power voltages. The cells 120-128 perform a predetermined function. The predetermined function can include a processing function (e.g., a logic function), a physical function (e.g., a filler cell, decap cell, or a header cell), or a signal storage function. In one example, the cells 120-128 are standard cells of a library of cells. In one example, the cells 120-128 include parallel gate structures. The cells 120-128 are placed in one or more rows (e.g., row1-row4) of the circuit design 100 within the power delivery network 102. For example, the cells 120 and 122 are in row 1, the cells 124 and 126 are in row2, and the cell 128 is in row2 and row3.

The cells 120-128 are connected via signal wires. The signal wires are disposed within one or more of the metal layers within the circuit design 100. The signal wires are routed via a routing engine (e.g., the routing engine 210 of FIG. 2) of a circuit design system (e.g., the circuit design system 200 of FIG. 2). In one example, the signal wires are routed within the unused areas within the circuit design 100. The unused areas are areas within the metal layers that do not include routing for the power wires 110, 112 and/or the power staples 116, 118.

Connecting the power wires 110 via the power staples 116 and the power wires 112 via the power staples 118 reduces the voltage drop (e.g., IR drop) within the circuit design, increasing the amount of current provided to the cells 120-128. However, as is noted above, the power staples 116 and 118 decrease the available area to route the signal wires for connecting the cells 120-128. In one example, reducing the number of the power staples 116 and the power staples 118, increases the area available to route the signal wires for the cells 120-128, and reduces the difficulty in the routing process to route the signal wires.

In one example, the number of power staples 116 and 118 is reduced, depopulating the power staples, to increase the area available to route the signal wires. The signal wires of the cells 120-128 are then routed, utilizing at least a portion of the area vacated by the removed power staples. After the signal wires are routed, power staples are re-inserted, repopulated, or over-populated within the power delivery network 102 to increase the available power to the cells 120-128, reducing voltage drop within the power delivery network 102. The circuit design system 200 of FIG. 2 analyzes a power delivery network (e.g., the power delivery network 102 of FIG. 1) to depopulate the power staples, and repopulate the power staples after routing the signal wires. The circuit design system 200 may be an electronic design automation system. In other examples, the circuit design system 200 may be other types of circuit design tools.

Figure 2:
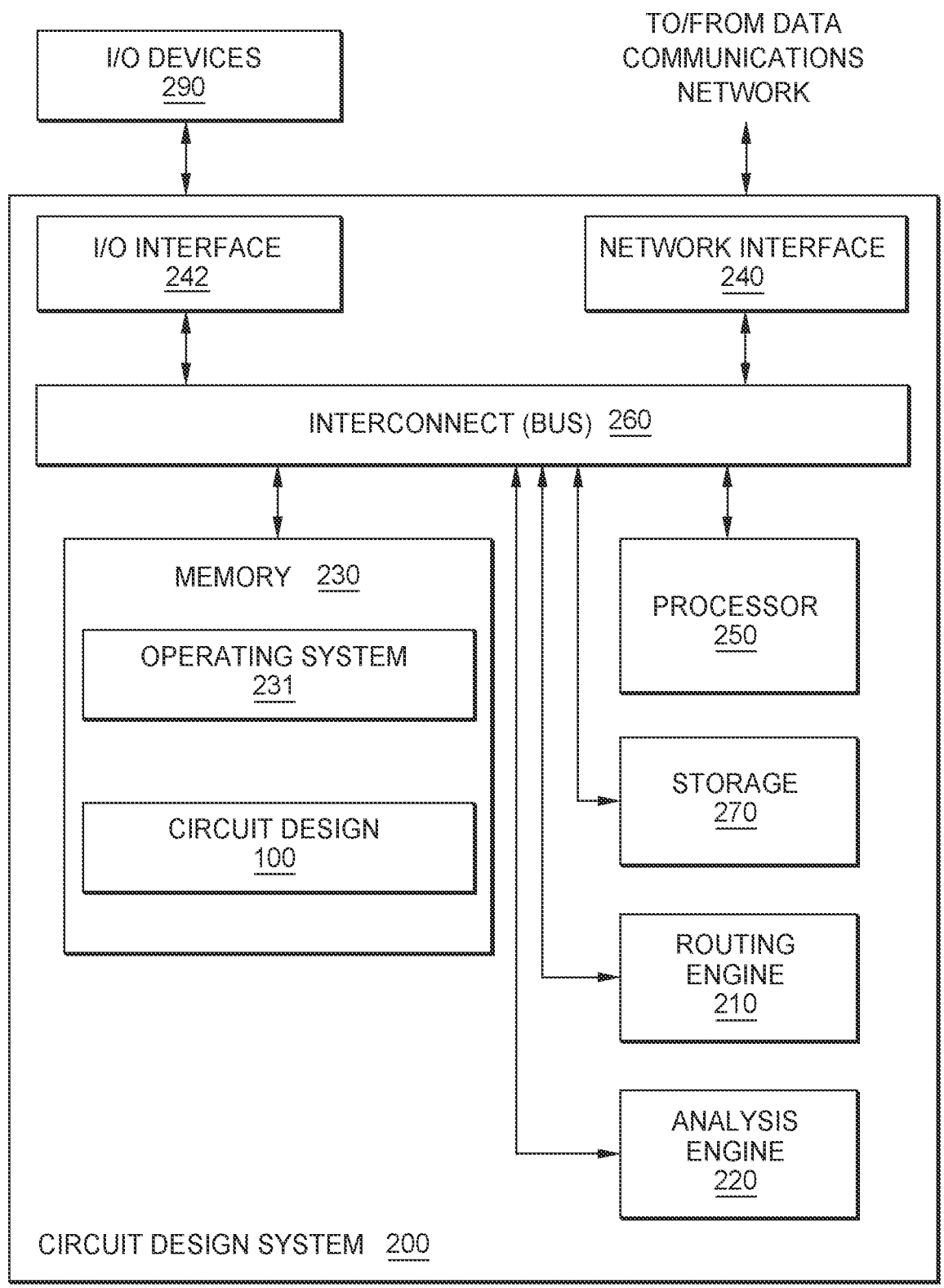
FIG. 2 illustrates a schematic block diagram of a circuit design system, according to one or more examples.

FIG. 2 illustrates the circuit design system 200. As shown, the circuit design system 200 includes, without limitation, a computer processor 250 (e.g., a central processing unit), a network interface 240, and memory 230. The circuit design system 200 may also include an input/output (I/O) device interface 242 connecting I/O devices 290 (e.g., keyboard, display and mouse devices) to the circuit design system 200.

The computer processor 250 retrieves and executes programming instructions stored in the memory 230 (e.g., a non-transitory computer readable medium). Similarly, the computer processor 250 stores and retrieves application data residing in the memory 230. An interconnect 260 facilitates transmission, such as of programming instructions and application data, between the computer processor 250, I/O device interface 242, storage 270, network interface 240, and memory 230. The computer processor 250 is included to be representative of a single processor, multiple processors, a single processor having multiple processing cores, and the like. Further, the memory 230 and the storage 270 are generally included to be representative of volatile and non-volatile memory elements. For example, the memory 230 and the storage 270 can include random access memory and a disk drive storage device. Although shown as a single unit, the memory 230 or the storage 270 may be a combination of fixed and/or removable storage devices, such as magnetic disk drives, flash drives, removable memory cards or optical storage, network attached storage (NAS), or a storage area-network (SAN). The storage 270 may include both local storage devices and remote storage devices accessible via the network interface 240. Further, one or more software modules 232 are maintained in the memory to perform the functions of generating an updated power network delivery network, as is described in the following.

As shown, the memory 230 includes an operating system 231. The operating system 231 may facilitate receiving input from and providing output to various components. For example, the network interface 240 can be used to transmit and/or receive a circuit design.

The circuit design system 200 further includes a routing engine 210. The routing engine 210 includes one or more processors (e.g., the computer processor 250) that execute instructions stored within the memory 230. The routing engine 210 receives a circuit design (e.g., the circuit design 100 of FIG. 1) from the memory 230 via the interconnect 260. The routing engine 210 places (e.g., inserts) the power staples 116 and 118 to form connections between two or more of the power wires 110 and two or more of the power wires 112. Further, the routing engine 210 places (e.g., inserts) signal wires connecting the cells 120-128 with the circuit design 100. The routing engine 210 further inserts (e.g., repopulates or over-populates) power staples in available areas within the power delivery network 102 after the signal wires are routed.

The circuit design system 200 further includes an analysis engine 220. The analysis engine 220 includes one or more processors (e.g., the computer processor 250) that execute instructions stored within the memory 230. The analysis engine 220 obtains the circuit design 100 from the memory 230 via the interconnect 260 and determines power characteristics of the cells 120-128 within the circuit design 100. The power characteristics correspond to the power requirements of the cells 120-128. Further, the analysis engine 220 generates an updated timing model after the power staples are repopulated or over-populated within the power tile.

Further, the circuit design system 200 is included to be representative of a physical computing system as well as virtual machine instances hosted on a set of underlying physical computing systems. Further still, although shown as a single computing device, one of ordinary skill in the art will recognize that the components of the circuit design system 200 shown in FIG. 2 may be distributed across multiple computing systems connected by a data communications network.

Figure 3:
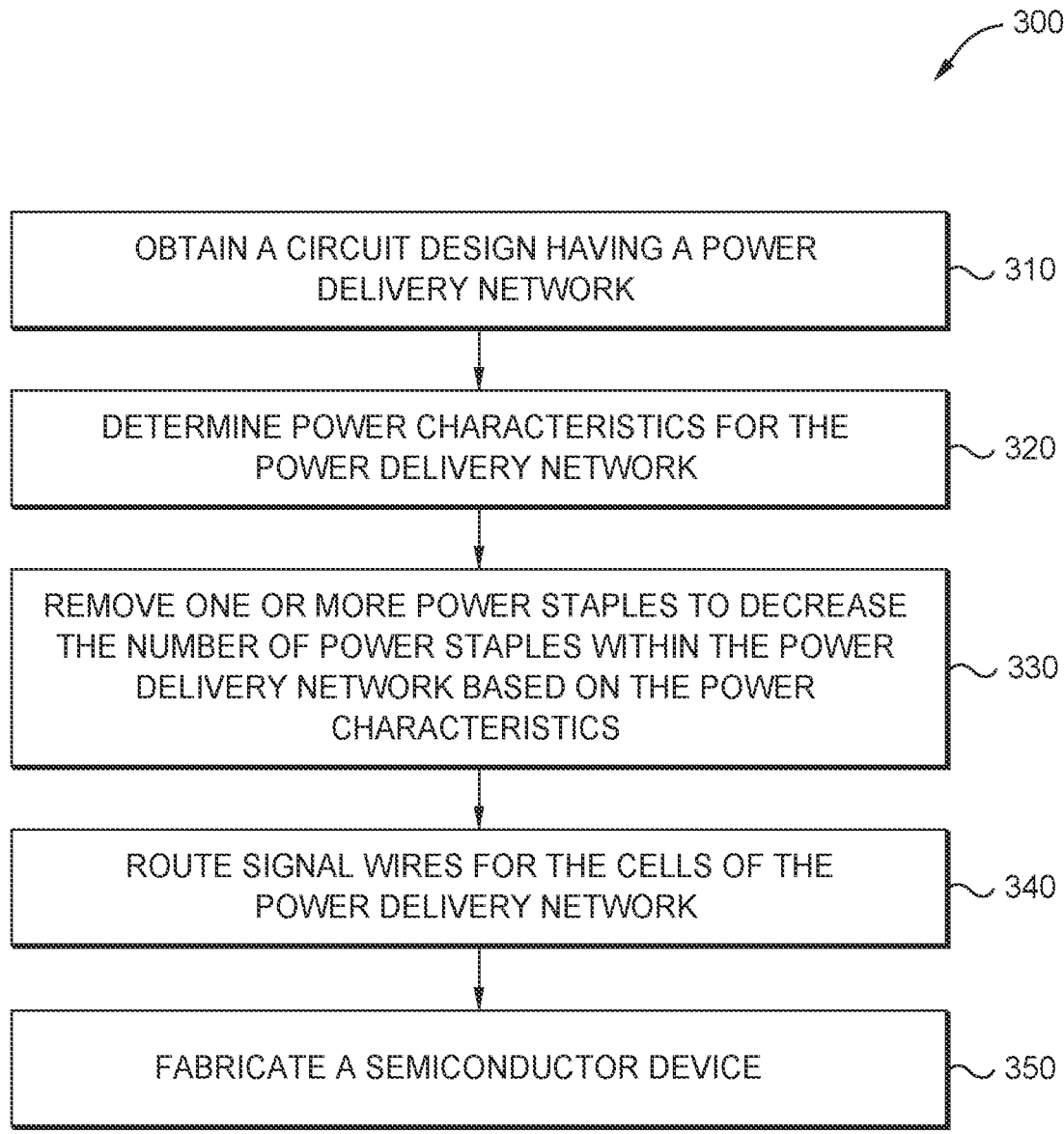
FIG. 3 is a flowchart of a method for generating a power delivery network for a circuit design, according to one or more examples.

FIG. 3 illustrates a flowchart of a method 300 for updating a power delivery network (e.g., the power delivery network 102 of FIG. 1), according to one or more examples. The method 300 is performed by the circuit design system 200 of FIG. 2. For example, one or more one or more processors of the circuit design system 200 executes instructions stored within the memory 230 to perform the method 300.

At the block 310 of the method 300, the routing engine 210 obtains a circuit design having a power delivery network. In one example, one or more processors of the routing engine 210 executes instructions stored within the memory 230 to obtain the circuit design from the memory 230. With reference to FIG. 1, the routing engine 210 places the power staples 116 and 118 within the circuit design 100, connecting pairs of the power wires 110 and 112 together. In one example, one of the power staples 116 is connected to two or more of the power wires 110 through one or more vias and overlaps one or more of the power wires 112. Further, one of the power staples 118 is connected to two or more of the power wires 112 through one or more vias, and overlaps one or more of the power wires 110.

At block 320 the analysis engine 220 determines power characteristics for the power delivery network 102 in the circuit design 100 of FIG. 1. For example, one or more processors of the analysis engine 220 executes instructions stored within the memory 230 to determine the power characteristics for the power delivery network 102 in the circuit design 100. The power characteristics of the power delivery network 102 includes to the amount of power provided by the power delivery network 102 to each of the cells 120-128 of the circuit design 100 and the amount of power required by the cells 120-128 of the circuit design 100. In one example, determining the power characteristics includes determining the amount of power provided by the power delivery network 102 to each of the cells 120-128. Determining the amount of power provided by the power delivery network 102 to each of the cells 120-128 includes determining the number and location of the power staples 116 and 118. Further, in one example, determining the power characteristics of the power delivery network 102 includes determining the amount of power required by the cells 120-128 of the circuit design 100. In one example, the amount of power corresponds to the amount of current required by the cells 120-128 for the cells to function as expected. The amount of current required by the cells 120-128 may correspond to the number of cells within a region of the circuit design 100. For example, the region 130 uses more current than the region 132 as the region 130 includes three and a half cells, and the region 132 is free from cells. Accordingly, the current requirement of the region 130 is higher than the current requirement of the region 132.

In one example, determining the power characteristics includes determining the timing path awareness for the circuit design 100. For example, the analysis engine 220 determines whether or not the cells 120-128 are part of a critical path. In a critical path, the amount of slack, extra time between the source clock and a capture clock within a clock cycle, is less than a threshold value (e.g. about 10 picoseconds). Further, cells along a critical path have more stringent timing requirements (e.g. containing more gates or higher wire loads) than cells along a non-critical path. A non-critical path may correspond to a cell that drives a static signal, or a signal that travels through a small number of gates with little load. More generally, a non-critical path corresponds to a signal that has an amount of slack that is greater than a user-defined threshold corresponding to some percentage of a clock cycle. This slack threshold may vary depending on the speed of the clock, the design of the logic, and technology-induced timing variability, among others.

The analysis engine 220 stores the cells that are identified to be along a critical path within the memory 230. In another example, the analysis engine 220 stores the cells that are identified to be along a non-critical path within the memory 230.

At block 330, the analysis engine 220 removes one or more power staples to decrease the number of power staples within the power delivery network based on the power characteristics. In one example, the analysis engine 220 determines power staples to be removed based on the power characteristics. For example, the power characteristics are used to identify the number of staples required to achieve the power requirements of each of the cells. In one example, the power requirements for each cell is compared to the power characteristics to determine which of the power staples may be removed. For example, with reference to FIG. 1, the power requirements of the cells 120-128 are compared to the power characteristics determined for the circuit design 100. One or more of the power staples 116 and 118 are removed based on the comparison of the power characteristics to the power requirements of the cells 120-128 if the comparison shows larger current-carrying capacity in the power grid than is necessary to supply the cells to achieve to corresponding timing requirements.

At block 340 of the method 300, the routing engine 210 routes signal wires for the cells 120-128 within the circuit design 100. The routing engine 210 may thus route the signal wires for the cells 120-128 using one or more of the routing tracks made available by removing the power staples. Accordingly, the flexibility when routing the signals is improved, decreasing difficulty of the routing process.

In one example, the analysis engine 220 determines cells for which the power staples are not able to be removed (e.g., under populated). This condition is identified by comparing the cell power (and/or timing) requirement to the power grid where one or more power staples are depopulated. If that depopulated grid is insufficient to meet the power and/or timing requirement of the cell that power tile is prohibited from depopulating staples by the analysis engine 220.

At block 350 of the method 300, a semiconductor device is fabricated. In one example, as will be described with regard to FIG. 5, an updated circuit design is generated based on the power delivery network generated at block 340. An updated timing model is generated for the updated circuit design, and the updated timing model and the updated circuit design are used during a semiconductor fabrication process to fabricate a semiconductor device.

In one example, removing power staples improves design resources within the power delivery network by providing access to additional routing tracks, e.g., metal tracks, within the power delivery network to route signal wires for the cells. As is described above, the additional routing tracks may be used to route signal wires for the cells 120-128. Further, the additional routing tracks may be used to position vias for the signal wires, increasing the area that is available to position the vias.

Figure 4:
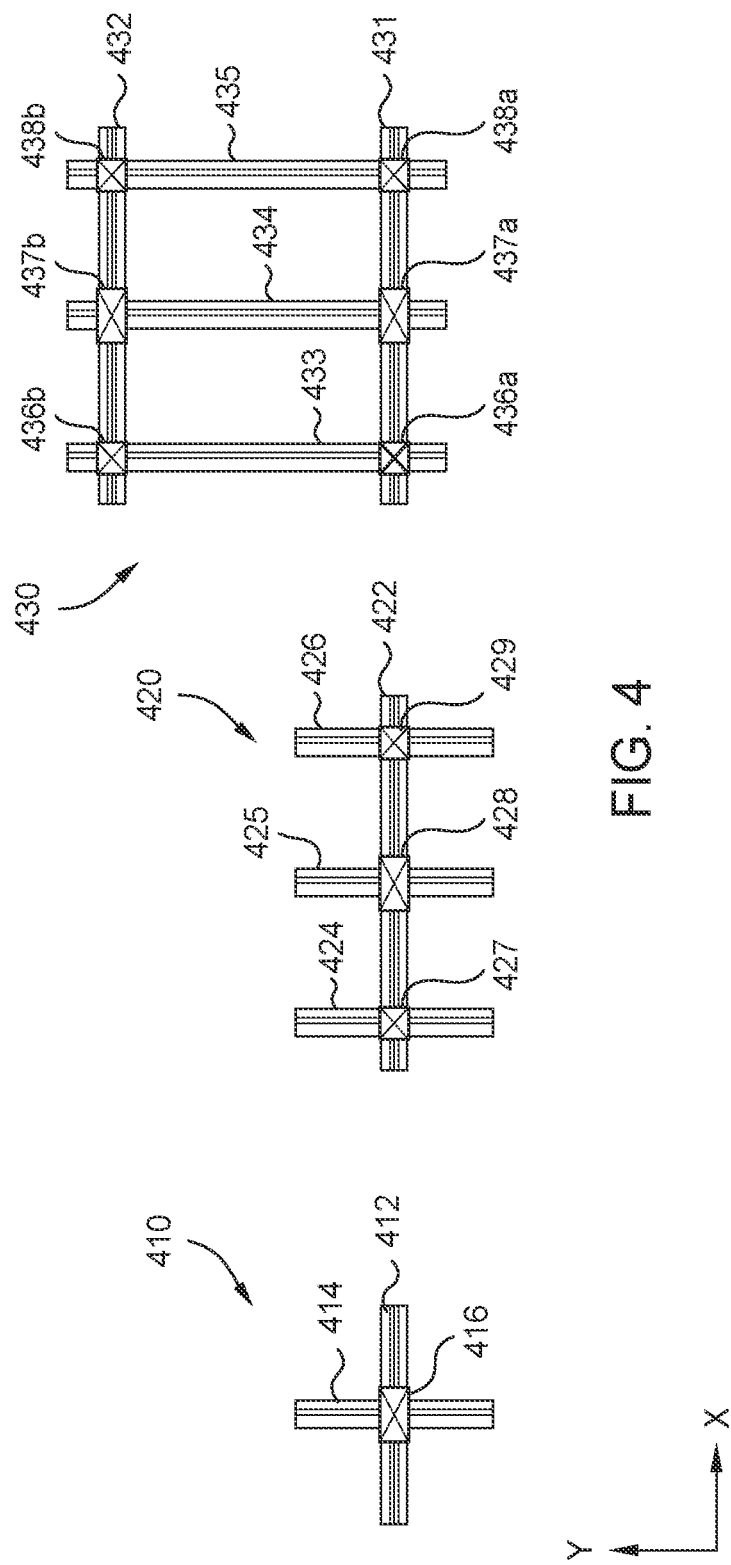
FIG. 4 illustrates various interactions between power wires and power staples within a power delivery network.

FIG. 4 illustrates example various examples of interactions between power staples and power wires. In interaction 410 of FIG. 4, the power staple 414 is connected to the power wire 412 through via 416. The power wire 412 may be one of the power wires 110 or one of the power wires 112 of FIG. 1. The power staple 414 is one of the power staples 116 or the power staples 118 of FIG. 1. While not illustrated in FIG. 4, the power staple 414 may overlap one or more power wires to which the power staple 414 is not connected. Further, the power staple 414 extends in the +Y and/or −Y direction, and the power wire 412 extends in the +X and/or −X direction.

In interaction 420, the power staple 424 is connected to the power wire 422 through via 427, the power staple 425 is connected to the power wire 422 through via 428, and the power staple 426 is connected to the power wire 422 through via 429. The power wire 422 may be one of the power wires 110 or one of the power wires 112 of FIG. 1. The power staples 424, 425, and 426 are one of the power staples 116 or the power staples 118 of FIG. 1. While not illustrated in FIG. 4, the power staples 424, 425, and/or 426 may overlap one or more power wires to which the power staples 424, 425, and/or 426 are not connected. Further, the power staples 424, 425, and/or 426 extend in the +Y and/or −Y direction, and the power wires 431 and 432 extend in the +X and/or −X direction.

In interaction 430, the power staple 433 is connected to the power wire 431 through via 436a and the power wire 432 through via 436b. The power staple 434 is connected to the power wire 431 to through via 437a and the power wire 432 through via 437b. The power staple 435 is connected to the power wire 431 through via 438a and the power wire 432 through via 438b. The power wire 431 and the power wire 432 may be one of the power wires 110 or one of the power wires 112 of FIG. 1. The power staples 433, 434, and 435 are one of the power staples 116 or the power staples 118 of FIG. 1. While not illustrated in FIG. 4, the power staples 433, 434, and/or 435 may overlap one or more power wires to which the power staples 433, 434, and/or 435 are not connected. Further, the power staples 433, 434, and/or 435 extend in the +Y and/or −Y direction, and the power wires 431 and 432 extend in the +X and/or −X direction.

In one or more examples, as is described above with regard to method 300 of FIG. 3, in the interaction 410, the power staple 414 (and associated via 416) may be removed based on a comparison of the power characteristics to the power requirements. For example, once removed, the routing track within the metal layers associated with the power staple 414 may be used to route a signal wire. In interaction 420, one or more of the power staples 424-426, and associated via or vias, is removed based on the comparison of the power characteristics to the power requirements. In one example, each of the power staples 424-426 and vias 427, 428 and 429 may be removed. In interaction 430, one or more of the power staples 433-435, and associated via or vias, is removed based on the comparison of the power characteristics to the power requirements. In one example, each of the power staples 433-435, and each of the vias 436a, 436b, 437a, 437b, 438a, and 438b may be removed. Removing the power staple 414 (and associated via 416), one or more of the power staples 424-426 (and associated vias 427-429), or one or more of the power staples 433-435 (and associated vias 436a, 436b, 437a, 437b, 438a, and 438b) provides one or more additional routing tracks to route signal wires. In one example, the vias 436-438 are also removed based on removing the corresponding ones of the power staples 433, 434, and 435. Removing the vias provides further area that may be used to route signal wires and/or corresponding vias for the signal wires.

Figure 5:
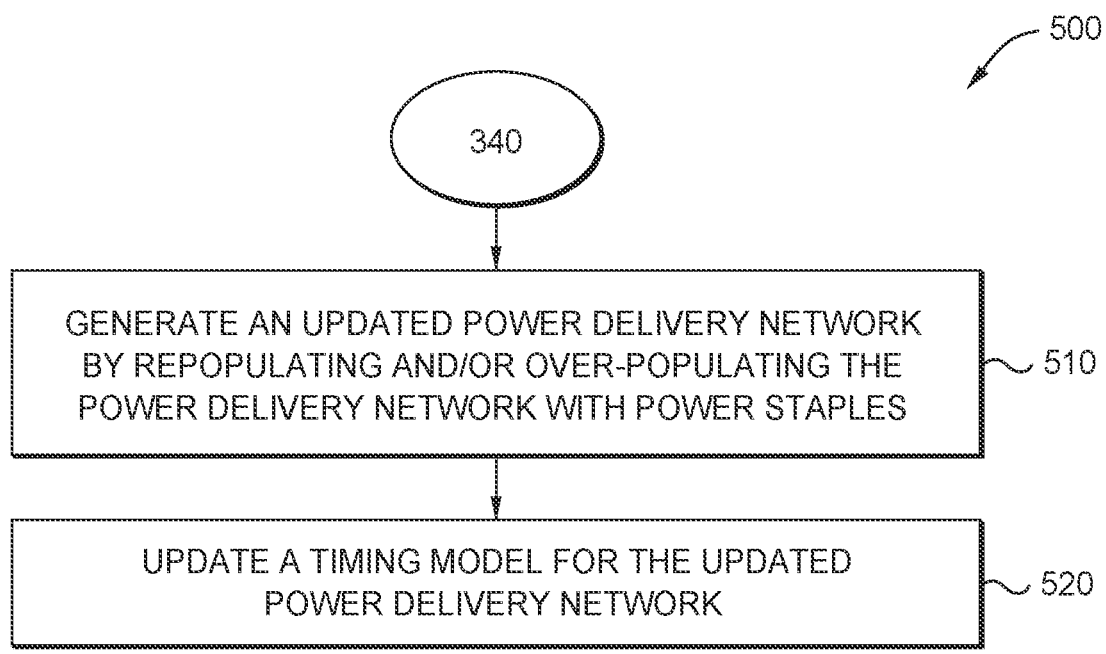
FIG. 5 is a flowchart of a method for generating a power delivery network for a circuit design, according to one or more examples.

FIG. 5 illustrates a method 500 for determining an updated timing model for a power delivery network, according to one or more examples. The method 500 is performed by the circuit design system 200 of FIG. 2. For example, one or more one or more processors of the circuit design system 200 executes instructions stored within the memory 230 to perform the method 500.

The method 500 begins after the block 340 of the method 300. At block 510, the routing engine 210 generates an updated power tile that may include repopulating or over-populating the power tile with one or more power staples. The block 510 occurs after block 340 such that the repopulating and/or over-populating occur after routing signal wires within the power delivery network. In one example, one or more processors of the routing engine 210 executes instructions stored within the memory 230 to repopulate and/or over-populate the power delivery network with one or more power staples. In one example, the routing engine 210 determines areas within a power tile of a power delivery network where power staples can be inserted based on the routing tracks that were not used to route the signal wires. In one example, the routing engine 210 determines areas within the power tile that were not used for routing signal wires for the cells 120-128. In one example, with reference to interaction 410 of FIG. 4, the removed power staple 414 is reinserted based on the determination that a routing track associated with the power staple 414 is not used to route signal wires, and that no signal vias were placed that might interfere with placement of the via 416. Further, with reference to interaction 420 of FIG. 4, the power staple 425 is reinserted based on the determination the routing track associated with the power staple 425 is not used to route signal wires, and that no signal vias were placed that might interfere with placement of the via 428. With reference to interaction 430 of FIG. 4, the power staple 433 is reinserted based on the determination the routing track associated with the power staple 433 is not used to route signal wires, and that no signal vias were placed that might interfere with placement of the vias 436a and/or 436b.

In one example, over-populating a power tile of a power delivery network with power staples includes adding power staples to areas within the power tile that are not used for routing signal wires or a pre-defined power staple track. For example, the routing engine 210 identifies a routing track or tracks within the circuit design 100 that are not used to route signal wires or power staples and adds one or more additional power staples based on the determination that there are signal tracks within the power tile that are not used for routing signal wires or power staples.

The analysis engine 220 stores the updated power delivery network and corresponding updated circuit design within the memory 230.

At block 520, the analysis engine 220 determines an updated timing model for the power tile. For example, one or more processors of the analysis engine 220 executes instructions stored within a memory to obtain the updated power tile and determine an updated timing model for the updated power tile. The analysis engine 220 determines a timing offset for the updated power tile of the power delivery network from the original power tile of the power delivery network. The timing offset is determined based on the updated timing information for each of the cells (e.g., the cells 120-128). The updated timing information reflects the updated positions of the power staples determined during block 510. The analysis engine 220 determines a timing offset from the updated timing information, and generates an updated timing model based on the timing model for the original power tile and the timing offset. The timing model is stored by the analysis engine 220 within the memory 230.

In one example, the block 350 of FIG. 3 occurs after block 520 such that a semiconductor device is fabricated based on an updated circuit design including the updated power delivery network, and the updated timing model.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., circuit design tools) or related data available in the cloud. For example, the functions of the routing engine 210 and/or the analysis engine 220 could execute on a computing system in the cloud to place power staples and route signal wires within a circuit design. In such a case, the routing engine 210 and/or the analysis engine 220 analyze a circuit design, and determines the placement of power staples and the routing of signal wires, and stores an updated circuit design at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   determining power characteristics for a power delivery network of a circuit design based on logic cells of the circuit design, the power delivery network comprises power wires and power staples connecting pairs of the power wires to each other;
   removing a first one or more of the power staples from the power delivery network based on the power characteristics;
   routing signal wires for the logic cells after removing the first one or more of the power staples, wherein routing the signal wires includes routing a first signal wire of the signal wires in a routing track corresponding to the first one or more of the power staples;
   inserting a second one or more of the power staples within the power delivery network based on routing the signal wires to generate an updated power delivery network; and
   generating an updated timing model for the updated power delivery network.

2. The method of claim 1, wherein generating the updated timing model comprises:

generating a timing offset based on the updated power delivery network; and updating timing information for each cell within the power delivery network based on the updated timing model.

3. The method of claim 1, wherein determining the power characteristics comprises determining a non-critical path within the circuit design, and removing the first one or more of the power staples based on the determination of the non-critical path.

4. The method of claim 1, wherein the power wires include a first power wire, and a second power wire, wherein a first power staple and a second power staple of the power staples connect the first power wire and the second power wire, and wherein removing the first one or more of the power staples comprises removing the first power staple based on the power characteristics.

5. The method of claim 4, wherein routing the signal wires for the logic cells after removing the first one or more of the power staples, comprises routing a first one of the signal wires within a routing track associated with the first power staple.

6. The method of claim 4, further comprising determining that a routing track associated with the first power staple was unused when routing the signal wires for the logic cells, and reinserting the first power staple within the power delivery network.

7. A circuit design system comprising:
an analysis engine configured to:
determine power characteristics for a power delivery network of a circuit design based on logic cells of the circuit design, the power delivery network comprises power wires and power staples connecting pairs of the power wires to each other; and
remove a first one or more of the power staples from the power delivery network based on the power characteristics; and
a routing engine configured to route signal wires for the logic cells after removing the one or more of the power staples, wherein routing the signal wires includes routing a first signal wire of the signal wires in a routing track associated with the first one or more of the power staples, wherein the analysis engine is further configured to insert a second one or more of the power staples within the power delivery network based on routing the signal wires to generate an updated power delivery network, and generate an updated timing model for the updated power delivery network.

8. The circuit design system of claim 7, wherein determining the power characteristics comprises determining a non-critical path within the circuit design, and removing the first one or more of the power staples based on the determination of the non-critical path.

9. The circuit design system of claim 7, wherein the power wires include a first power wire and a second power wire, wherein a first power staple of the power staples connects the first power wire and the second power wire, and wherein removing the first one or more of the power staples comprises removing the first power staple based on the power characteristics.

10. The circuit design system of claim 9, wherein routing the signal wires for the logic cells after removing the first one or more of the power staples, comprises routing a first one of the signal wires within a routing track associated with the first power staple.

11. The circuit design system of claim 10, wherein the analysis engine is further configured to determine that a routing track associated with the first power staple was unused when routing the signal wires for the logic cells, and reinsert the first power staple within the power delivery network.

12. The circuit design system of claim 7, wherein generating the updated timing model comprises:
generating a timing offset based on the updated power delivery network; and
updating timing information for each cell within the power delivery network based on the updated timing model.

13. A computer program product for generating a circuit design, the computer program product comprising:
a computer-readable storage medium having computer-readable program code embodied therewith, the computer-readable program code executable by one or more computer processors to:
determine power characteristics for a power delivery network of the circuit design based on logic cells of the circuit design, the power delivery network comprises power wires and power staples connecting pairs of the power wires to each other;
remove a first one or more of the power staples from the power delivery network based on the power characteristics;
route signal wires for the logic cells after removing the first one or more of the power staples, wherein routing the signal wires includes routing a first signal wire of the signal wires in a routing track associated with the first one or more of the power staples;
insert a second one or more of the power staples within the power delivery network based on routing the signal wires to generate an updated power delivery network; and
generate an updated timing model for the updated power delivery network.

14. The computer program product of claim 13, wherein determining the power characteristics comprises determining a non-critical path within the circuit design, and removing the first one or more of the power staples based on the determination of the non-critical path.

15. The computer program product of claim 13, wherein the power wires include a first power wire and a second power wire, wherein a first power staple and a second power staple of the power staples connect the first power wire and the second power wire, and wherein removing the first one or more of the power staples comprises removing the first power staple based on the power characteristics.

16. The computer program product of claim 15, wherein routing the signal wires for the logic cells after removing the first one or more of the power staples, comprises routing a first one of the signal wires within a routing track associated with the first power staple.

17. The computer program product of claim 13, wherein generating the updated timing model comprises:
generating a timing offset based on the updated power delivery network; and
updating timing information for each cell within the power delivery network based on the updated timing model.

* * * * *